US008539502B1

(12) United States Patent
Sanin et al.

(10) Patent No.: US 8,539,502 B1
(45) Date of Patent: Sep. 17, 2013

(54) METHOD FOR OBTAINING REPEATABLE AND PREDICTABLE OUTPUT RESULTS IN A CONTINUOUS PROCESSING SYSTEM

(75) Inventors: Aleksey Sanin, Sunnyvale, CA (US); Mark Tsimelzon, Sunnyvale, CA (US); Ian D. Marshall, Sunnyvale, CA (US); Robert B. Hagmann, Palo Alto, CA (US)

(73) Assignee: Sybase, Inc., Dublin, CA (US)

( * ) Notice: Subject to any disclaimer, the term of this patent is extended or adjusted under 35 U.S.C. 154(b) by 1617 days.

(21) Appl. No.: 11/787,912

(22) Filed: Apr. 18, 2007

Related U.S. Application Data

(60) Provisional application No. 60/793,450, filed on Apr. 20, 2006, provisional application No. 60/819,302, filed on Jul. 7, 2006.

(51) Int. Cl.
*G06F 9/46* (2006.01)
*G06F 7/00* (2006.01)

(52) U.S. Cl.
USPC ........... 718/107; 718/100; 718/101; 718/103; 707/607

(58) Field of Classification Search
USPC ......... 718/106, 103, 100, 101, 107; 707/607, 707/610
See application file for complete search history.

(56) References Cited

U.S. PATENT DOCUMENTS

| 5,664,190 A * | 9/1997 | Cohen et al. ................. 718/100 |
| 5,828,881 A * | 10/1998 | Wang ............................ 719/314 |
| 6,327,630 B1 * | 12/2001 | Carroll et al. ................. 719/314 |
| 8,046,744 B1 * | 10/2011 | Marshall et al. .............. 717/128 |
| 2003/0105620 A1 * | 6/2003 | Bowen ............................ 703/22 |
| 2006/0026130 A1 * | 2/2006 | Botzer et al. ...................... 707/3 |

OTHER PUBLICATIONS

Manjikian et al "Using Split Event Sets to Form Schedule Event Combination in Discrete Event Simulation", 1992, Proceedings of the 25th annual symposium on Simulation IEEE Computer Society Press Los Alamitos, CA, pp. 184-191.*
Moser et al. "Totem: Afault-tolerant Multicast Group Communication System",1996, Communication of the ACM, pp. 54-63.*

* cited by examiner

*Primary Examiner* — Emerson Puente
*Assistant Examiner* — Willy W Huaracha
(74) *Attorney, Agent, or Firm* — Sterne, Kessler, Goldstein & Fox P.L.L.C.

(57) ABSTRACT

The present invention provides a method for obtaining predicable and repeatable output results in a continuous processing system. The method involves processing messages and primitives in accordance with the following rules: (1) Messages are processed in accordance with timestamps, where messages are divided up into "time slices"; (2) message order within a data stream is preserved among messages with the same time stamp; (3) subject to rule #4, for each time slice, a primitive is executed when either the messages within such time slice show up in the input stream for such primitive or the state of the window immediately preceding such primitive changes due to messages within such time slice; and (4) for each time slice, primitives that are dependent on one or more upstream primitives are not executed until such upstream primitives have finished executing messages in such time slice that are queued for processing. If such rules are insufficient to determine the order in which primitives are processed, a deterministic "tie-breaking" rule is then applied.

19 Claims, 8 Drawing Sheets

(Background Information)

(Background Information)

METHOD FOR OBTAINING REPEATABLE AND PREDICTABLE OUTPUT RESULTS IN A CONTINUOUS PROCESSING SYSTEM

RELATED APPLICATIONS

This application claims the benefit of U.S. Provisional Application No. 60/793,450 filed on Apr. 20, 2006 with inventors Aleksey Sanin, Mark Tsimelzon, Ian D. Marshall, and Robert B. Hagmann and titled "Order of Execution, Semantics, and Synchronization in a Continuous Processing System," the contents of which are incorporated by reference as if fully disclosed herein. This application also claims the benefit of U.S. Provisional Application No. 60/819,302 filed on Jul. 7, 2006 with inventors Aleksey Sanin, Ian D. Marshall, and Giuliano Carlini and titled "DB Joiner and Passive Synchronizers Real Query Processor 'Timezones,'" the contents of which are incorporated by reference as if fully disclosed herein.

BACKGROUND OF THE INVENTION

1. Field of the Invention

This invention relates generally to continuous processing systems that process streaming data, and, more specifically, to order of execution in a continuous processing system.

2. Description of the Background Art

A continuous processing system processes streaming data. It includes statements (such as queries), written by programmers, which operate continuously on input data streams and which publish to output data streams. In such system, it is difficult to achieve predictable and repeatable output results.

When statements written by programmers are compiled, an execution graph is created, where the execution graph is comprised of connected primitives that correspond to the compiled statements. An execution graph in continuous processing systems specifies the path for processing messages in accordance with the statements. It is common, and sometimes necessary, in such systems to process primitives associated with statements in parallel and "join" the output of such primitives with "joiner" primitives as appropriate. FIG. 1a illustrates a "Fork and join" where messages coming from "Fork" 110 can come to "Join" 120 through Path 1 or Path 2.

Having a "fork and join" in an execution graph can result in unpredictable and unrepeatable output results. For instance in the execution graph illustrated in FIG. 1b, any of the following can happen:

"Message 1" goes into Joiner "J1", slot 1, before "Message 2" goes into window "W2";
"Message 1" goes into Joiner "J1", slot 1, after "Message 2" goes into window "W2";
"Message 2" goes into Joiner "J1", slot 1, before "Message 1" goes into window "W1";
"Message 2" goes into Joiner "J1", slot 2, after "Message 1" goes into window "W1."

Therefore, there is a need for a method for executing primitives (including "fork and join" primitives) in a manner that will produce predictable and repeatable output results.

SUMMARY

The present invention provides a method for providing predictable and repeatable output results in a continuous processing system. The method involves processing messages and primitives in accordance with the following rules.

1. TimeStamp Isolation

Under the TimeStamp Isolation rule, messages are processed in accordance with the internal system timestamp associated with the message. The messages with the next timestamp are not processed until all the messages with the previous timestamp are processed. In one embodiment, incoming messages for a module are divided into "time slices," where a time slice is set of messages that have the same timestamp and that are processed together.

2. Message Order

Under this rule, message order is preserved among messages with the same timestamp in the same stream. If message X and Y have the same timestamp, and message X comes into a stream before message Y, then message X will be processed before message Y.

3. Execution Graph Order

Under this rule, messages in a time slice are pushed through the execution graph in the order of the execution graph. Subject to rule #4, in processing a time slice, a primitive is executed when either messages in the time slice show up in the input stream for such primitive or the state of the window immediately preceding such primitive changes.

4. Data Dependency

Under this rule, for each time slice, primitives that are dependent on one or more upstream primitives are not executed until such upstream primitives have finished executing messages within such time slice that are queued for processing. If data from primitive X is used by primitive Y, then, within a time slice, X always happens before Y.

If the above rules are insufficient to determine when primitives are processed, then a deterministic, tie-breaking rule is used to determine the order in which primitives are processed.

DETAILED DESCRIPTION OF THE PREFERRED EMBODIMENTS

Figure 1A:
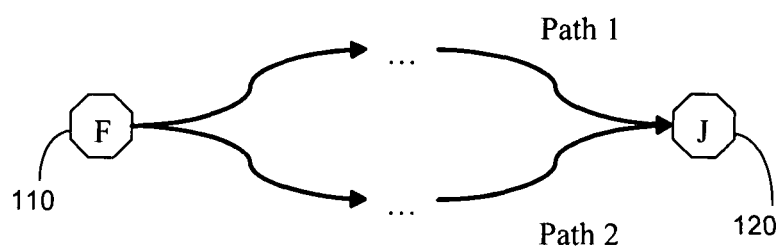
FIGS. 1a-1b are block diagrams that illustrate fork-and-join message flow.
Figure 1B:
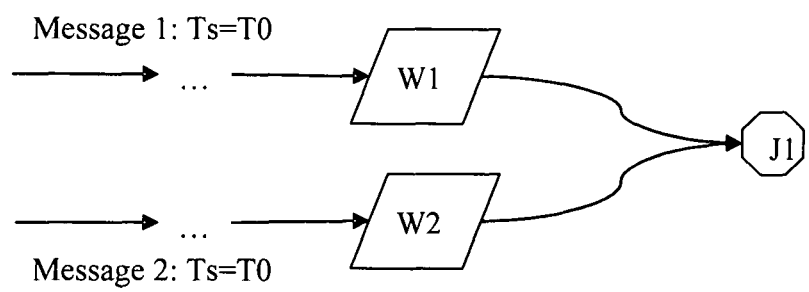
Figure 2:
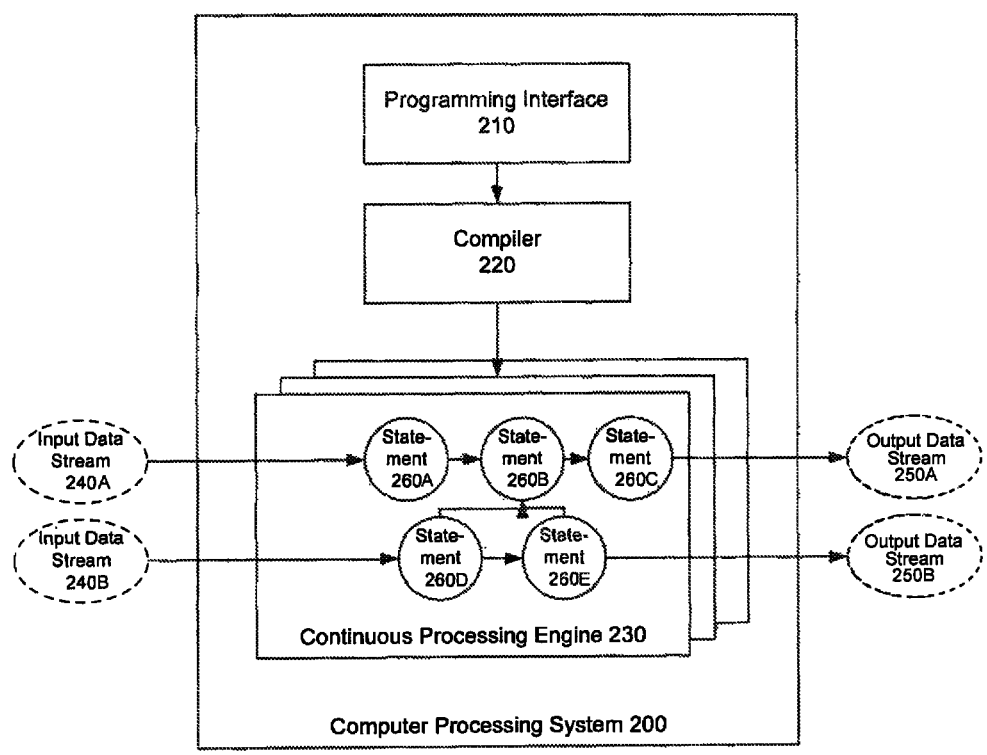
FIG. 2 is a block diagram that illustrates one embodiment of a continuous processing system.

FIG. 2 illustrates an example of a continuous processing system that processes streaming data. The system 200 includes a programming interface 210, a compiler 220, and a continuous processing engine 230, where the engine may be distributed over a cluster of servers. The programming interface 210 enables programmers to write statements 260A-E (such as queries), which are then complied by the compiler 220 and provided to the continuous processing engine 230.

A coherent sequence of statements is referred to as a "module." A module subscribes to one or more input data streams 240A-B and publishes to one or more output data streams 250A-B. Through the engine 230, a module operates on input data streams continuously.

When the compiler 220 compiles a module, an execution graph is created for executing the module. The execution graph comprises a set of connected primitives, where the primitives correspond to statements in the module. Examples of primitives include filters, joiners, aggregators, and windows.

Coral8, Inc.'s "Complex Event Processing" engine is an example of a continuous processing system. Also, one embodiment of a continuous processing system is described in U.S. patent application Ser. No. 11/015,963, filed on Dec. 17, 2004 with Mark Tsimelzon as the first-named inventor, and titled "Publish and Subscribe Capable Continuous Query Processor for Real-time data streams," the contents of which are incorporated by reference as if fully disclosed herein.

Statements may be written in a continuous-processing software language (CPL), which is sometimes also referred to as a continuous correlation language (CCL). An example of such a language described in the U.S. patent application Ser. No. 11/346,119, filed on Feb. 2, 2006, and titled "Continuous Processing Language for Real-time Data Streams," the contents of which are incorporated by reference as if fully disclosed herein.

Figure 3:
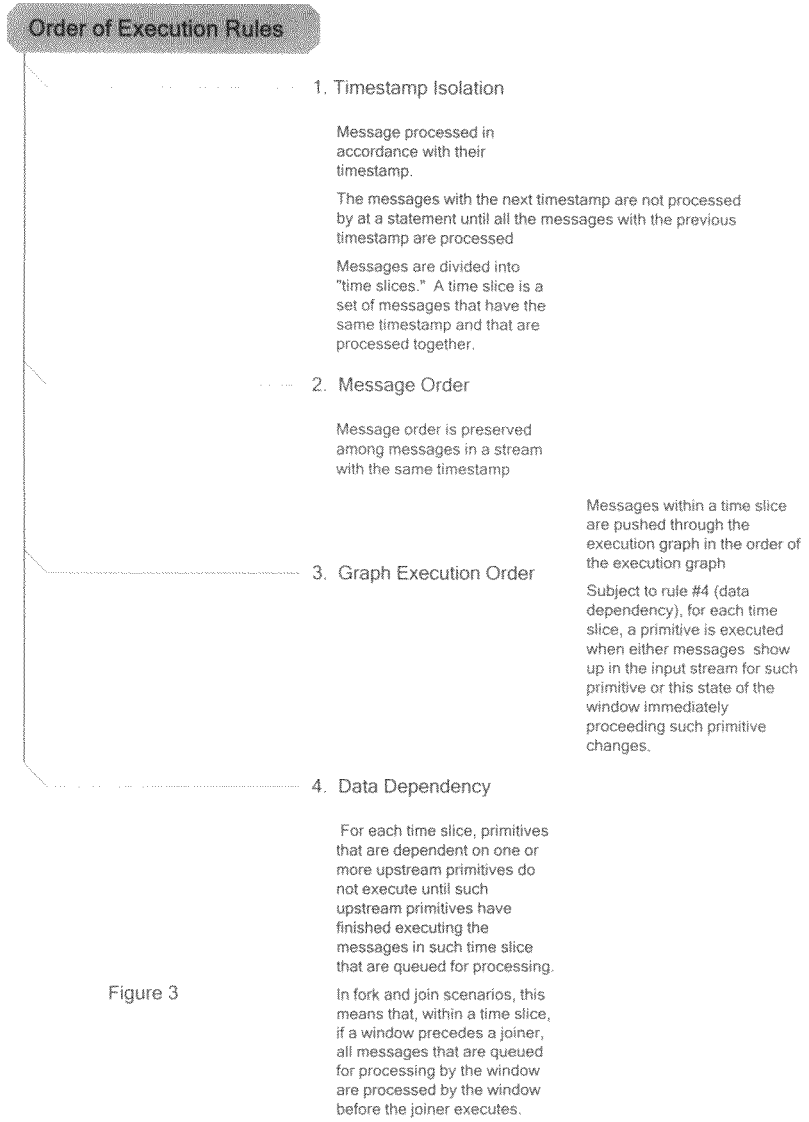
FIG. 3 is a mind map that illustrates rules for order of execution in a continuous processing system.

The present invention provides a method for providing predictable and repeatable output results in a continuous processing system. The method involves processing messages and primitives (which are generated when statements are compiled) in accordance with the rules illustrated in FIG. 3 and described below. Message processing order is determined by rules #1 and #2, and primitive processing order is determined by rules #3 and #4. As shown in FIG. 3, such rules are as follows:

1. TimeStamp Isolation

Data streams are made up of rows of messages. Each data stream has a schema that defines the fields in the rows (i.e., the columns), the order of the fields, and the names of the fields. Every row has at least one implicit field: the row timestamp. The row timestamp is an internal system time and need not be the same as event time.

Under the TimeStamp Isolation rule, messages are processed in accordance with the internal system timestamp associated with the message. The messages with the next timestamp are not processed until all the messages with the previous timestamp are processed.

In one embodiment, incoming messages for a module are divided into "time slices." A "time slice" is a set of messages that have the same timestamp and that are processed together. A time slice can consist of just one message, or it can have multiple messages. Not all messages with the same timestamp need to be in the same time slice, but all messages within a time slice must have the same timestamp. If a group of messages with the same timestamp needs to be processed together, then they will all be part of the same time slice. During execution, the order between time slices is preserved.

2. Message Order

Under this rule, message order is preserved among messages in a stream with the same timestamp. In other words, messages with the same time stamp are processed in the order in which they come into a stream and are not reordered during execution. If messages X and Y have the same time stamp, and message X comes into a stream before message Y, then message X will be processed before message Y. This rule means that messages within a time slice are not reordered (since messages within a time slice will all have same time stamp).

The Message Order rule also establishes (or partially establishes) an order between time slices. Those skilled in the art will appreciate that time slices can run concurrently, but each time slice appears to be executed separately and the order between time slices is effectively preserved.

Message order is not guaranteed between streams. For instance, if message X comes in on Stream "S1," then message Y on Stream "S2," then message Z on stream "S1," the continuous processing system may execute the messages in the order X, Z, Y.

3. Execution Graph Order

Figure 4:
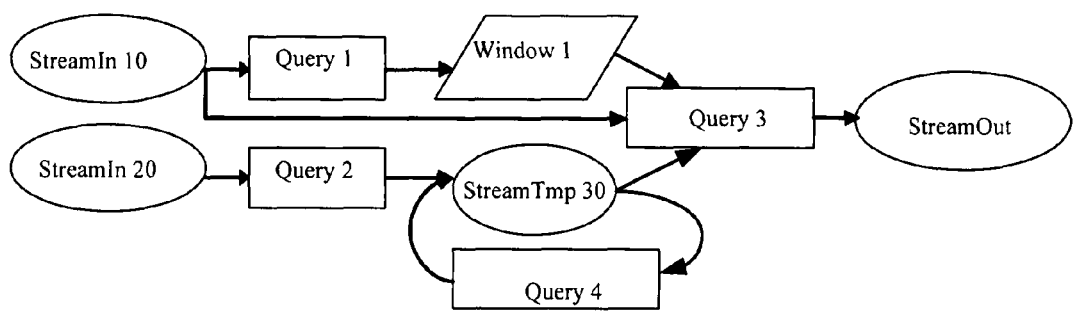
FIG. 4 is a block diagram that illustrates an example execution graph.

Under this rule, messages in a time slice are pushed through the execution graph in the order of the execution graph. Subject to rule #4 (data dependency), for each time slice, a primitive is executed when either the messages within such time slice show up in the input stream for such primitive or the state of the window immediately preceding such primitive changes. For instance, in the graph illustrated in FIG. 4:

Query 1 is executed when messages show up in StreamIn 10;

Query 2 is executed when messages show up in StreamIn 20;

Query 3 is executed when messages show up in StreamIn 10, StreamTmp 30, or the state of Window 1 changes; and Query 4 is executed when messages show up in StreamTmp 30.

4. Data Dependency

Under this rule, for each time slice, primitives that are dependent on one or more upstream primitives are not executed until such upstream primitives have finished executing messages within such time slice that are queued for processing. If data from primitive X is used by primitive Y, then, within the processing of a time slice, X always happens before Y. Upstream primitives include directly-connected upstream primitives, as well as indirectly connected upstream primitives. For instances, with respect to Query 3 in FIG. 4, Window 1 is a directly-connected upstream primitive, and Query 1 is an indirectly-connected upstream primitive.

In one embodiment, this rule, as well as the Execution Graph Order Rule, is implemented in fork-and-join cases by applying the following rule: If a window precedes a joiner, then, within a time slice, all messages that are queued for processing by the window are processed by the window BEFORE the joiner itself executes.

In this embodiment, a compiler associated with the continuous processing engine assigns a "scheduler priority" to all the primitives in the execution graph as follows:

All non-joiner primitives have priority 0.

The joiner "scheduler priority" is defined as the largest number of other joiners preceding this joiner from the input stream(s) plus one.

All the joiners in a "loop" have same priority.

Once selected for processing, a primitive is thoroughly processed for all messages within the time slice that are currently queued for it.

Figure 5A:
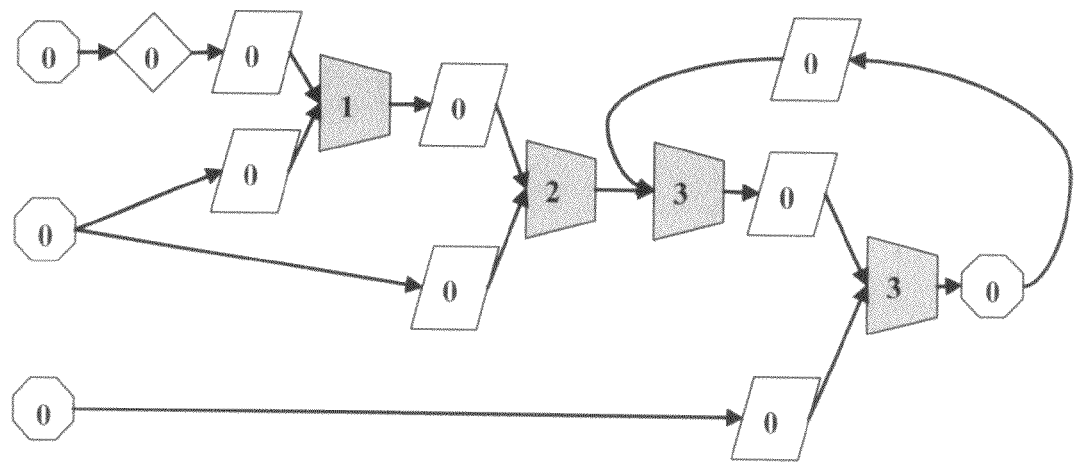
FIGS. 5a-e are block diagrams that illustrate the priorities assigned to primitives within an example execution graph.

The above-described priority assignments are illustrated in example illustrated in FIG. 5a. In FIGS. 5a-5e, the trapezoids represent joiners, the parallelograms represent windows, and the other shapes represent other non-joiner primitives.

The continuous processing engine processes incoming messages as follows:

All messages with the same timestamp are processed in one or more time slices (in the preferred embodiment messages, with the same time stamp they are processed in the same time slice).

Inside one time slice the messages are scheduled for processing according to the primitives' "scheduler priority", where the lower the "scheduler priority" number, the higher the priority for executing (e.g., primitives with "0" priority will be executed before primitive with "1" priority, which will be executed before primitive with "2" priority, etc.).

Note that processing a lower-priority primitive (e.g., "3") might generate messages for processing by a higher-priority primitive(s) (e.g., "1"). In this case, processing of low-priority primitives is halted until the high-priority primitive(s) is processed. However, the current primitive being processed completes its current processing before any processing is halted (i.e., it completes any messages it started processing before any processing is halted).

In a further embodiment of this example, messages within a joiner are processed in order of joiner slots. To enforce joiner slots processing order, the algorithm above is modified to assign "scheduler priorities" not to primitives but to primitive slots using the following "two-level" priority scheme:
<Slot Priority>:=<Primitive Priority>.<Slot Order Position>

Figure 5B:
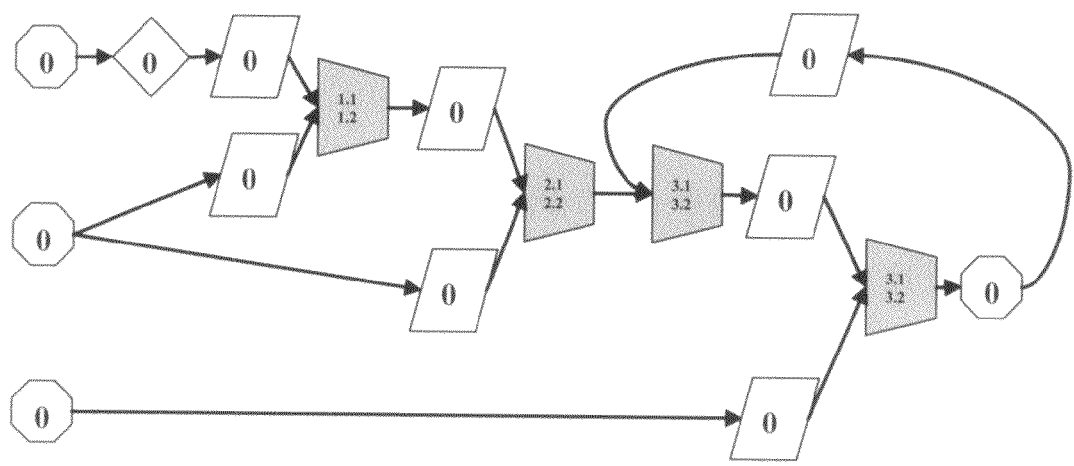

This priority scheme is illustrated in FIG. 5b.

Figure 5C:
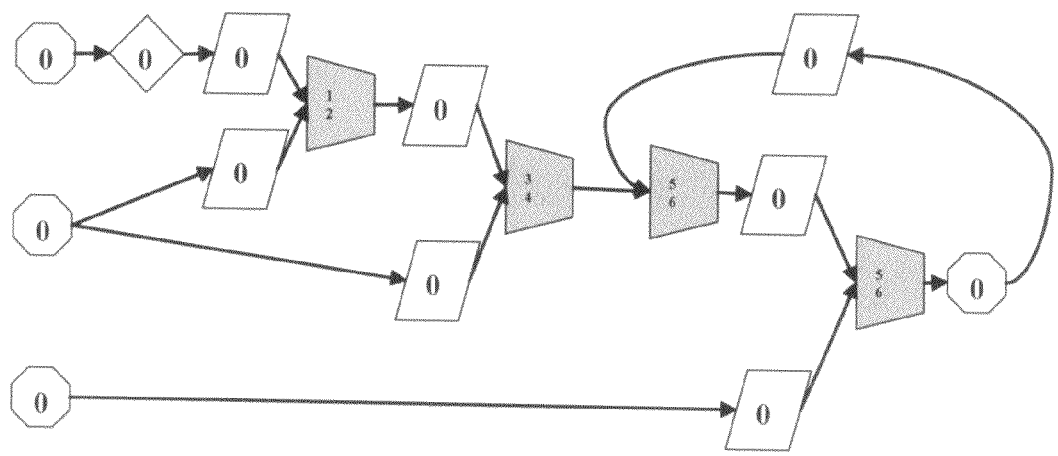

All "two-level" slot priorities are then flattened and assign a single priority number to each slot, as illustrated in FIG. 5c.

Figure 5D:
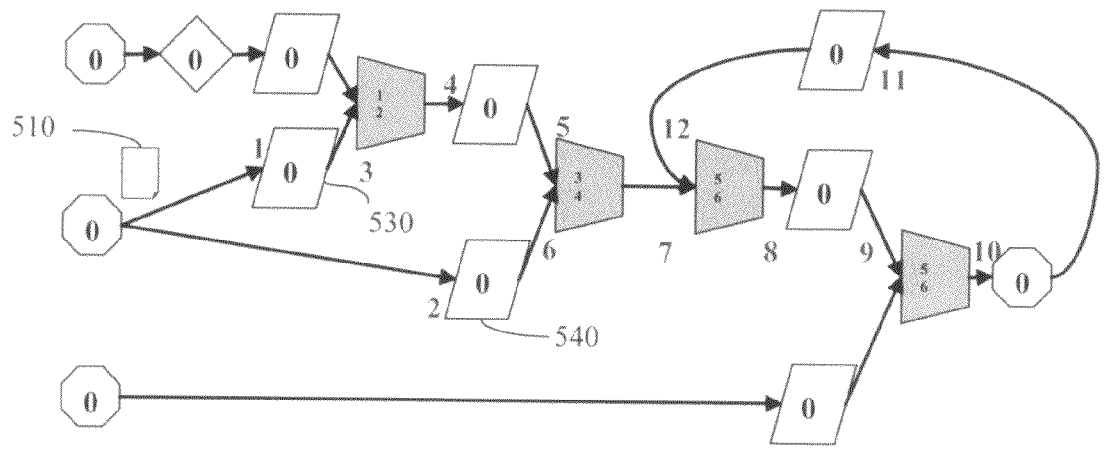

As an example, FIG. 5d illustrates the order in which primitives will execute the middle message 510 in FIG. 5d. The number inside each primitive illustrates the overall priority of the primitive (or slot in the case of joiners), and the number outside the primitives shows the order which message 510 will be processed. Please note that the above-described rule for windows and joiners is not sufficient for determining the order of execution between windows 530 and 540. Instead, a deterministic "tie-breaking" rule was applied to decide that window 530 would be first in the order of execution. Tie-breaking rules are described below in Section 5.

Figure 5E:
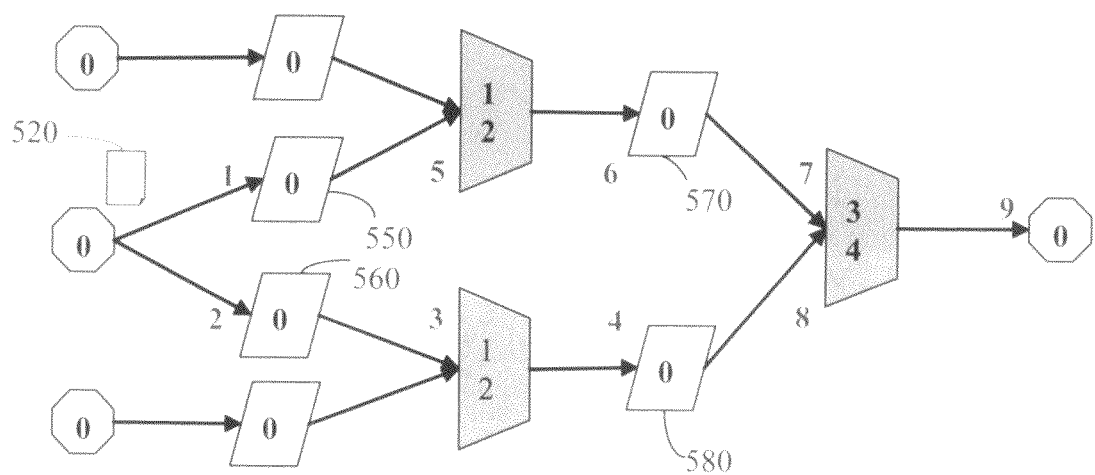

As a second example, FIG. 5e illustrates another execution graph and shows the order in which message 520 will be processed by the primitives in the execution graph. The number inside each primitive illustrates the overall priority of the primitive (or slot in the case of joiners), and the number outside the primitives shows the order which message 520 will be processed. A "tie-breaking" rule is used to ascertain the order of execution between windows 550 and 560 and between windows 570 and 580. Below is one way in which the above method for fork-and-join cases can be implemented in a data stream processing engine:

An array of multiple "per-priority" scheduler queues is created (instead of one queue).

Inside a "time slice" loop the current highest priority is retained and updated every time a new message is scheduled.

Messages from the queue with the current highest priority (e.g., "0") are processed first. If this queue is empty, then the queue with the next highest priority is processed (e.g., "1").

To ensure that all messages with the same timestamp are processed "at once," obtain all messages with the same time stamp at once (i.e., no artificial limit on the number of input messages that are obtained).

5. Tie Breaker

If rules #3 and #4 are insufficient to determine the order in which primitives are processed, then a deterministic, "tie-breaking" rule is used to determine the order in which primitives are processed. For example, if rules #3 and #4 are insufficient to determine the order in which primitives are processed, then the primitives may be executed in the order in which the statements corresponding to such primitives appear in the source code. For example, take the below statements written in Coral8's CCL language:
INSERT INTO StreamOut10 SELECT ii+1 FROM StreamIn1
INSERT INTO StreamOut10 SELECT ii+2 FROM StreamIn2.

Figure 6:
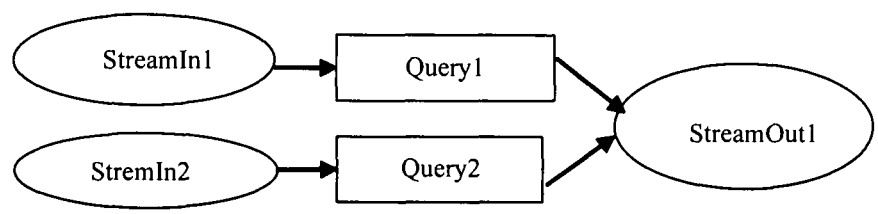
FIG. 6 is a block diagram that illustrates an execution graph.

The execution graph for such statements is illustrated in FIG. 6. Query1 in FIG. 6 corresponds to the first statement above, and Query2 corresponds to the second statement. If both StreamIn1 and StreamIn2 have available messages with the same timestamp, then Query1 will be executed before Query2, and, in StreamOut1, the first message will have value (ii+1) and the second message will have value (ii+2) because Query1 corresponds to the first statement and Query2 corresponds to the second statement.

In a similar way, if two queries update the same variable then the result value will depend on the order of queries in the source code. For example, take the below statements, which are also written in Coral8's CCL language:
CREATE VARIABLE INT X=0;
ON StreamIn1 SET X=X+ii;
ON StreamIn1 SET X=X*ii;

The new value of variable X will be $(X_{prev}+ii)*ii$ because of the order of the statements in the source code.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for obtaining repeatable and predictable output results when processing messages by using a module in a continuous processing system, where the module comprises a set of primitives that correspond to one or more processing statements, the method comprising:
    receiving a plurality of messages for the module from an input stream having a schema and subscribed to by the module, the messages each having a timestamp, wherein timestamps may be the same among the individual messages and messages are individually configured to be processed by one or more primitives associated with the module;
    grouping one or more of the received messages for the module into at least one time slice based on the timestamp associated with each message, wherein multiple time slices can share a same timestamp and include messages configured to be a processed by a same primitive;
    selecting a time slice for processing based on a first order; and
    for messages grouped within the selected time slice:
        selecting a particular message to process based on a second order, and
        selecting a primitive to process the selected particular message.

2. The method of claim 1, selecting a primitive to process the selected particular message comprises selecting a primitive based on an order in which statements associated with the primitive associated with the selected particular message appear in source code for the module.

3. The method of claim 1, wherein selecting a primitive to process the selected particular message comprises selecting a primitive based on a deterministic algorithm.

4. The method of claim 2, wherein, when a window primitive precedes a joiner primitive, then, within a time slice, the selecting of a particular message to process based on an order that a primitive associated with the particular message appears within the source code for the module is overridden, and all messages that are queued for processing by the window primitive are processed by the window primitive before the joiner primitive executes.

5. The method of claim 1, wherein selecting a particular message to process is further based on a priority, wherein primitives are assigned a priority as follows:
   assigning non-joiner primitives a highest priority;
   assigning upstream joiner primitives higher priority than downstream joiner priorities; and
   assigning joiner primitives in a loop equal priority.

6. The method of claim 5, wherein messages received by a joiner primitive are processed in order of joiner slots.

7. The method of claim 1, wherein selecting a particular message to process is further based on a process comprising: selecting a primitive to process when a state of a window primitive immediately preceding the primitive changes, provided that primitives that are dependent on the output of one or more upstream primitives are not executed until the upstream primitives have finished processing any messages within the time slice that are queued for processing.

8. The method of claim 1, wherein selecting a time slice for processing based on a first order comprises selecting time slices for processing based on a first in, first out rule.

9. The method of claim 1, wherein selecting a particular message to process based on a second order comprises selecting a particular message to process based on a priority assigned to the particular message.

10. The method of claim 1, further comprising generating an output stream based on processing the selected message using the selected particular primitive.

11. The method of claim 1, further comprising compiling the one or more processing statements into the set of primitives.

12. A continuous processing engine comprising:
   a module having a set of primitives that correspond to one or more processing statements;
   a message receiver configured to receive a plurality of messages for the module from a first input stream having a schema and subscribed to by the module, individual messages each having a timestamp, wherein timestamps may be the same among the individual messages and messages are individually configured to be processed by one or more primitives associated with the module;
   a message processor configured to process a selected message using one or more primitives of the set of primitives;
   a time slice grouper configured to group one or more of the received messages for the module into at least one time slice based on the timestamp associated with each message, wherein multiple time slices can share a same timestamp and include messages configured to be a processed by a same primitive;
   a time slice selector configured to select a time slice for processing based on a first order;
   a message selector configured, for messages grouped within the selected time slice, to select a particular message for processing by the message processor based on a second order; and
   a primitive selector configured to select a primitive to process the selected particular message.

13. The continuous processing engine of claim 12, wherein the message selector is configured to select a particular message for processing by a primitive associated with the particular message based on a specification of a processing primitive in the particular message.

14. The continuous processing engine of claim 12, wherein the time slice grouper is configured to group messages to have all messages within a time slice be of a same timestamp.

15. The continuous processing engine of claim 12, wherein the time slice selector is configured to select a time slice for processing based on a first in, first out order.

16. The continuous processing engine of claim 12, wherein the message selector is further configured to select a particular message to process based on a priority assigned to the particular message.

17. The continuous processing engine of claim 12, further comprising an output stream generator configured to generate an output stream based on processing the selected message using the selected particular primitive.

18. The continuous processing engine of claim 12, wherein the primitive selector is further configured to select a particular message to process when a state of a window primitive immediately preceding the primitive changes, provided that primitives that are dependent on the output of one or more upstream primitives are not executed until the upstream primitives have finished processing any messages within the time slice that are queued for processing.

19. A non-transitory computer-readable medium having computer-executable instructions stored thereon that, when executed by a computing device, cause the computing device to perform a method for obtaining repeatable and predictable output results when processing messages by using a module in a continuous processing system, where the module comprises a set of primitives that correspond to one or more processing statements, the method comprising:
   receiving a plurality of messages for the module from an input stream having a schema and subscribed to by the module, the messages each having a timestamp, wherein timestamps may be the same among the individual messages and messages are individually configured to be processed by one or more primitives associated with the module;
   grouping one or more of the received messages for the module into at least one time slice based on the timestamp associated with each message, wherein multiple time slices can share a same timestamp and include messages configured to be a processed by a same primitive;
   selecting a time slice for processing based on a first order; and
   for messages grouped within the selected time slice:
      selecting a particular message to process based on a second order, and
      selecting a primitive to process the selected particular message.

* * * * *